United States Patent [19]

Uemiya et al.

[11] Patent Number: 5,192,579
[45] Date of Patent: Mar. 9, 1993

[54] METHOD OF FORMING THIN FILM ON FIBER END SURFACE BY BREAKING IT IN A VACUUM

[75] Inventors: Takafumi Uemiya; Naota Uenishi; Akira Mizoguchi; Yasuhiro Hattori, all of Osaka, Japan

[73] Assignee: Sumitomo Electric Industries, Ltd., Osaka, Japan

[21] Appl. No.: 751,091

[22] Filed: Aug. 28, 1991

[30] Foreign Application Priority Data

Aug. 29, 1990 [JP] Japan .................................. 2-228630
Dec. 19, 1990 [JP] Japan .................................. 2-403916

[51] Int. Cl.⁵ .................................................. B05D 3/06
[52] U.S. Cl. ................................... 427/571; 427/248.1; 427/294; 427/296; 427/523; 204/192.11; 204/192.22; 204/192.23; 385/130; 385/147
[58] Field of Search ............. 427/248.1, 294, 38, 427/296; 204/192.11, 192.22, 192.23; 385/130, 147

[56] References Cited

U.S. PATENT DOCUMENTS

| | | | |
|---|---|---|---|
| 4,083,708 | 4/1978 | Heath et al. | 427/248.1 |
| 4,277,523 | 7/1981 | Izumitani et al. | 427/294 |
| 4,746,480 | 5/1988 | Clark | 427/248.1 |
| 4,830,447 | 5/1988 | Kamiyama | . |
| 4,863,576 | 9/1989 | Collins et al. | 204/192.23 |
| 4,971,673 | 11/1990 | Weisweiler et al. | 204/192.23 |

FOREIGN PATENT DOCUMENTS 58-223631 12/1983 Japan .

*Primary Examiner*—Michael Lusignan
*Assistant Examiner*—Benjamin L. Utech
*Attorney, Agent, or Firm*—Cushman, Darby & Cushman

[57] ABSTRACT

A method for the production of a thin film on an end surface of a fiber made up of a core of an organic material, and a clad made of glass. This method involves the steps of placing the fiber in a vacuum chamber, reducing the pressure in the chamber, cutting the fiber under reduced pressure, and either simultaneously, or immediately after cutting the fiber, forming a thin film on the cut surface of the fiber.

12 Claims, 2 Drawing Sheets

METHOD OF FORMING THIN FILM ON FIBER END SURFACE BY BREAKING IT IN A VACUUM

BACKGROUND OF THE INVENTION

1. Field of the Invention

The present invention relates to a method of forming a thin film on an end surface of a fiber, such as an optical fiber or a fiber wavelength-conversion element, wherein the fiber consists of a core of an organic crystal and a clad made of glass.

2. Description of Related Art

Conventionally, optical waveguides or wavelength-conversion elements, are made up of a fiber, such as an optical fiber, or a fiber wavelength-conversion element, or the like. These fibers are generally made from a core of an organic crystal and a clad made of glass.

However, conventional fibers which have a core made of an organic crystal, have some problems. These arise because, depending on the kind of the organic crystal, the organic crystal core is sublimated from the end surface of the fiber. This reduces the coupling efficiency of laser light with the fiber. In addition, when the molecules which make up the organic crystal core contain hydrogen bonds, the fibers have displayed poor time-aging stability. This occurs, for example, when the exposed core at the fiber end surfaces contacts water in the atmosphere. The water enters the core and thereby reduces the light transmission properties of the fiber.

As one method of solving the foregoing problems, U.S. Pat. No. 4,830,447 discloses a method where a fluorine containing polymer is dissolved in a solvent and the resulting solution is applied onto a fiber end surface using a spin coater. This forms a thin film on the fiber end surface. However, there has been a problem with this method because the organic crystal core of the fiber is dissolved in the solvent during the spin coating. This results in a reduction in the coupling efficiency of laser light with a fiber treated in this manner.

When a thin film is formed on a fiber end surface using a dry process, such as a vacuum evaporation method, a different problem occurs, sublimation of the organic crystal core. This problem occurs because the time taken to evacuate an apparatus is so long that the organic crystal core is sublimed before a thin film can be formed on the end surface. This can occur even when the organic crystal does not sublime at ordinary temperature and ordinary pressure.

SUMMARY OF THE INVENTION

The present invention has been developed in view of the foregoing problems. An object of the present invention is to provide a method of forming a thin film on a fiber end surface, wherein the thin film can be formed without dissolving, subliming, or otherwise changing the quality of an organic crystal core. This allows the production of a fiber which is superior in time-aging stability.

The invention provides a method of forming a thin film on a fiber end surface wherein the fiber comprises an organic core and a glass clad. The method includes cutting the fiber under reduced pressure and forming a thin film on the cut surface of the fiber either simultaneously with or immediately after the cutting.

DETAILED DESCRIPTION OF THE PREFERRED EMBODIMENT

A thin film is formed on a cut surface of a fiber under reduced pressure. As a result, there is no possibility that the organic crystal constituting the core of the fiber will be dissolved or changed in quality. In addition, cutting the fiber under reduced pressure results in the thin film being formed on the cut surface of the fiber simultaneously with or immediately after the cutting.

Further, in fibers where a thin film is formed on the end surface using the present method, the core of organic crystal is prevented from contact with the atmosphere by the thin film.

The method according to the present invention will be described more specifically hereafter.

Figure 1:
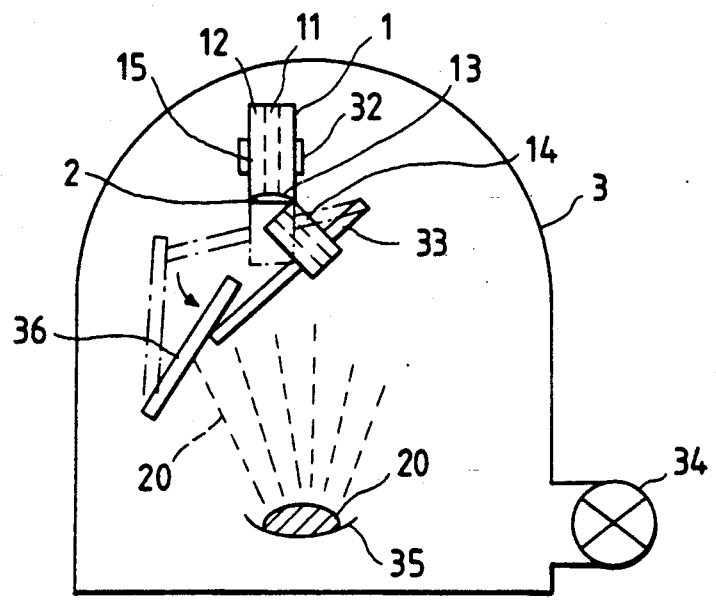
FIG. 1 is a simplified sectional view showing an embodiment of the method of the present invention.

FIG. 1 is a simplified sectional drawing which shows a process of forming a thin film 2 on a cut surface 13 of a fiber 1.

In this case, an incise is formed at a predetermined position so as to facilitate cutting at this position of the fiber 1. The fiber 1 has a core 11 made of organic crystal and a clad 12 made of glass. Fiber 1 is disposed in a vacuum chamber 3 in a vertical orientation so that the end portion 14 which is to be removed when fiber 1 is cut is located on the bottom end of the fiber. The other end portion 15, on which the thin film 2 is to be formed, is fixed by a fixing means 32. Next, the lower end portion 14 of fiber 1 is attached to a rod-like member 33 which is rotatably supported in the vacuum chamber 3. The pressure in the vacuum chamber 3 is reduced by a vacuum pump 34 and a thin film material 20 is scattered from an evaporation source 35.

As shown in FIG. 1, the rod-like member 33 is rotated in the direction of an arrow by a rotating member 36 provided in the vacuum chamber 3. This causes the fiber 1 to be bent at the incise and results in the fiber 1 being cut.

Since the thin film material 20 is evaporated in the vacuum chamber 3, the thin film material 20 adheres onto the cut surface 13 of the fiber 1 simultaneously with the cutting of the fiber. This forms the thin film 2.

Figure 2:
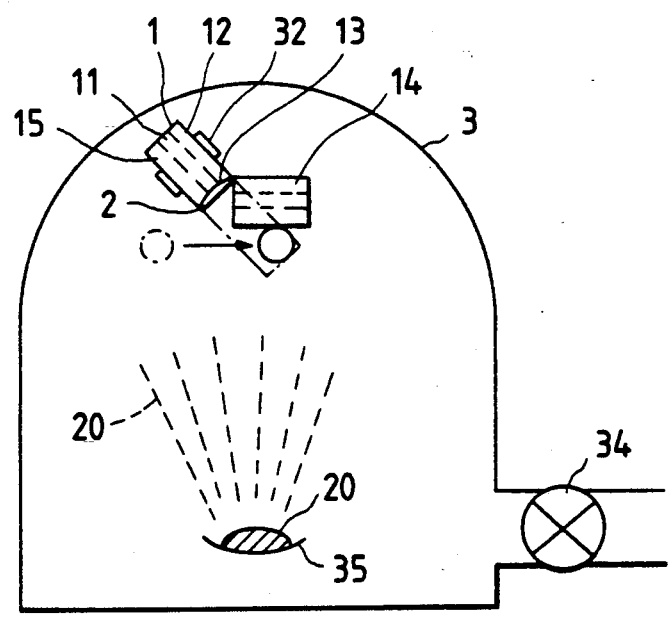
FIG. 2 is a simplified sectional view showing another embodiment of the present method.

When the core 11 is made of a crystal of an organic material which is susceptible to sublimation, a fiber 1 having an incise formed at a predetermined position is disposed obliquely in a vacuum chamber 3 so that the end portion 14 to be removed when the fiber is cut is at the bottom end of the fiber. The other end portion 15 is fixed by a fixing means 32, as shown in FIG. 2. The pressure in the vacuum chamber 3 is reduced by a vacuum pump 34. A movable member 37 which is vertically movably is provided in the vacuum chamber 3 and is moved in the direction of an arrow so as to make the end portion 14 rotate. This causes the fiber 1 to be bent so as to be cut at a predetermined position 10 where the incise was formed. During this process, a thin film material 20 is scattered from an evaporation source 35 so as to adhere onto the cut surface 13 of the fiber 1 to thereby form a thin film 2.

This operation is preferred as it prevents sublimation of the organic crystal core 11. Sublimation is avoided because the thin film 2 can be more rapidly formed when the fiber 1 is disposed obliquely. Thus, there is no shade portion for the scattering of the thin film material 20 onto the cut surface 13 of the fiber 1 in order to form thin film 2.

In addition, fiber 1 can be cooled during the process, so that sublimation of the organic crystal core 11 can be more effectively prevented.

When the organic crystal core material has a low sublimation rate, the film forming operation may be performed in the following manner. The fiber is cut and then the film is formed on the cut end. This application of the thin film takes place immediately after the cutting of the fiber. When this process is used, it is preferred that formation of the thin film on the cut surface 20 is started no later than 20 seconds after the fiber is cut.

Suitable methods for applying the thin film material 20 to the cut surface 13 of the fiber 1 to form the thin film 2 includes vapor-phase thin film forming methods. These methods include a sputtering method, a plasma CVD method, a cluster ion beam method (ICB method), an electron cyclotron resonance method (ECR method), and the like. A preferred method is one which uses ions or plasma to form the thin film 2. This forms a film which adheres well to the cut surface 13. These preferred methods include the sputtering method, the CVD method, the ICB method, and the ECR method. Further, since the highest melting point of the organic crystal core is about 300° C., it is more preferred to use the ICB method or the ECR method. In these methods, a thin film can be formed approximately at room temperature and the resulting thin film adheres well to the cut end.

The material for forming the thin film 2 is required to be transparent in the visible and near-infrared radiation regions, and it is preferred that this material is dielectric. Suitable examples of the thin film forming material include inorganic materials including $SiO_2$, $MgF_2$, $Al_2O_3$, $Si_4N_3$, $LiNbO_3$, $ZnO$ and organic materials including polyethylene, polymethyl methacrylate, polyacrylic acid. A preferred embodiment is one which uses an inorganic material which is low in permeability for a core material.

It is possible to make the thin film 2 a reflection reduction film. This is achieved by accurate control of the thickness of the thin film 2. The term "reflection reduction film" means that the film satisfies the following equation:

$$nd = \left(\frac{1}{4} + \frac{m}{2}\right)\lambda$$

(in the equation, m represents an integer not smaller than 0; n represents the refractive index of the film; d represents the film thickness; and $\lambda$ represents a wavelength). If the thin film 2 satisfies the following equation, then the refractive index of the thin film 2 is zero.

$$n = \sqrt{ns}$$

(In this equation, n represents the refractive index of the film and ns represents the refractive index of the single crystal of the organic nonlinear optical material which is the core).

Further, a second, high-refractive index layer, for example, made of $MgF_2$ may be formed on the thin film 2 as a reflection reduction film.

Various kinds of glass may be used to form the clad 12. Examples of suitable glass include, "PYREX" glass (registered trademark of CORNING Inc.), lead glass, and the like.

A variety of organic materials may be used to form the core 11. These materials include macromolecular materials such as silicone resin, styrene resin, acryl resin, and crystals such as anthracene, naphthalene, p-nitroaniline.

The method of the present invention is particularly effective in forming fiber wavelength-conversion elements where the core is made of an organic nonlinear optical crystal exhibiting a second degree nonlinear optical effect and the clad is made of glass, where the second harmonic of incident light is generated by Cerenkov radiation.

Cerenkov radiation is generated when the refractive indexes of the clad and core satisfy the following condition:

nclad(2ω)>ncore(ω)>nclad(ω) (nclad(2ω) represents the refractive index of the clad in the second harmonic waves, ncore(ω) represents the effective refractive index of the core in the fundamental wave, and nclad(ω) represents the refractive index of the clad in the fundamental wave).

The organic nonlinear optical crystal material is not particularly limited, and the method according to the present invention is effective with a variety of materials. Examples of suitable non-linear optical crystal materials include: 3-nitro-5-(N,N-dimethylamino)-acetanilide; 3-(N,N-dimethylamino)-aniline; N-(4'-methoxybenzoyl)-4-cyanoaniline; N-methyl-N-(4-cyanophenyl) aminoacetonitrile; N-(4-cyanophenyl) aminoacetonitrile; 4-nitrobenziriden-2,3-dimethylaniline; 4-nitrobenziriden-2,4-dimethylaniline; 4-nitrobenziriden-2,5-dimethylaniline; 4-nitrobenziriden-4,4-dimethylaniline; 4-nitro-benziriden-3,5-dimethylaniline; 4-nitrobenziriden-2,4-dimethoxyaniline; 4-nitrobenziriden-3,4,5-trimethoxyaniline; 2-nitrobenziriden-3, 4,5-trimethoxyaniline; 3-nitrobenziriden-2,3-dimethylaniline; 3-nitrobenziriden-2,5-dimethylaniline; 3-nitrobenziriden-3,5-dimethylaniline; 2-methyl-4-nitroaniline (MNA); 4-(N,N-dimethylamino)-3-acetamidenitrobenzene (DAN); 4,5-dimethyl-1, 3-dithiol-2-iridencyanoacetate; 1,3-dithiol-2-iridencyanoacetate; N-(4-nitrophenyl)-(S)-prolinol (NPP); N-(5-nitro-2-pyridyl)-(S)-prolinol (NPP); N-(5-nitro-2-pyridyl)-(S)-phenylalalinole (NPPA); 9-methylcarbazole-3-carboxaldehyde.

Further, the method according to the present invention can be effectively applied to fibers where the core is made of an organic nonlinear optical crystal which exhibits a three degree nonlinear optical effect. Suitable core materials of this type include organic coloring materials such as p-nitroaniline; 4-(dimethylamino)-4'-nitrostilbene; 4'-(N,N'-dimethylamino) benziriden-4-nitroaniline.

When the present invention is used, the organic crystal core of the element is not dissolved or changed in quality because a thin film is formed on a cut surface of a fiber under reduced pressure. Further, the thin film can be formed on the fiber end surface without dissolving, quality-changing, or sublimation of the organic crystal core because the fiber is cut in the pressure-reduced state and either at the same time or immediately after the cutting, the thin film is formed on the cut surface of the fiber. In addition, by forming the thin film on the fiber end surface, the organic crystal core can be prevented from contacting the atmosphere. This allows the production of a fiber which has superior time-aging stability.

The following examples illustrate the operation of the present invention but should not be viewed as limitations of the inventions scope.

EXAMPLE 1

A capillary tube of lead glass (SF4) having an inner diameter of 2 μm and an outer diameter of 500 μm was inserted into an ampule tube together with 4-(N,N-dimethyl)-amino-3-acetamidenitrobenzene (DAN), and vacuum-sealed. This tube was heated to 170° C. in a cylindrical heating furnace so that the DAN was fused. Then, the tube was drawn out of the heating region of the heating furnace at a rate of 3–5 mm/hour so that a single crystal of DAN was grown in the capillary tube. This produced a fiber wavelength-conversion element.

Next, $SiO_2$ was used as the thin film material and was placed in an evaporation source in a vacuum evaporator having a vacuum chamber as shown in FIG. 2. The fiber wavelength-conversion element having an incise at a predetermined position was disposed as shown in FIG. 2. The pressure in the vacuum chamber was reduced to $1 \times 10^{-6}$ torr, and the fiber wavelength-conversion element was cut as shown in FIG. 2 while $SiO_2$ was evaporated by electron heating. This formed a thin film of $SiO_2$ with a thickness of 3000Å on the cut surface at a rate of 100 Å/sec.

When the cut surface was observed through an optical microscope, it was confirmed that the end surface of the DAN core remained specular.

Figure 3:
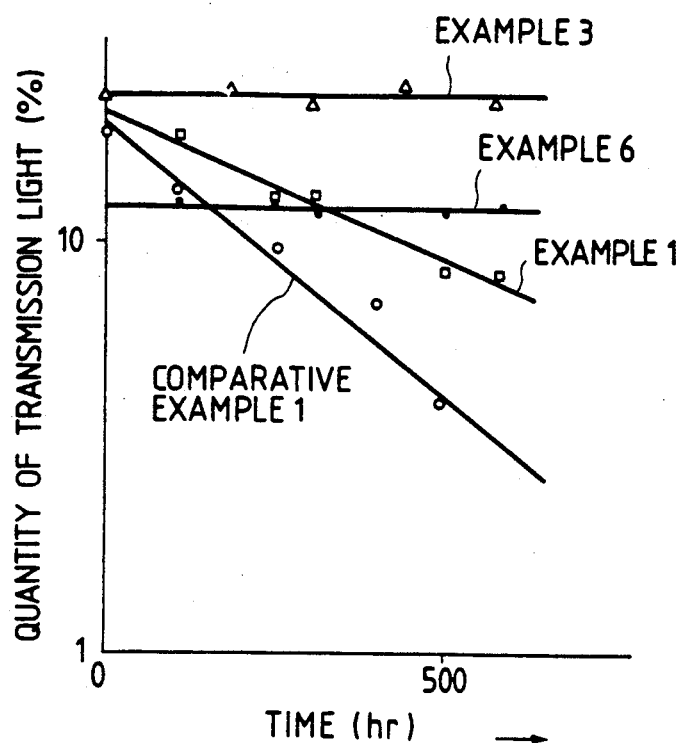
FIG. 3 is a graph which shows the time-aging of the amount of light transmitted from a HeNe laser in the fiber wavelength-conversion elements obtained from Examples 1, 3 and 6 and Comparative Example 1 respectively.

Further, the time aging of the amount of transmitted light of a HeNe laser was examined with respect to the fiber wavelength-conversion element having the thin film at its fiber end surface. FIG. 3 shows the results. The amount of light transmission loss was much less in the fiber on which the thin film was formed. In a fiber wavelength-conversion element having a core made of DAN which is not coated, the core contacts the atmosphere, such as air, at the fiber end surface and water enters the core which increases the amount of transmitted light which is lost.

EXAMPLE 2

A fiber wavelength-conversion element was formed in the same manner as in Example 1 except that the formation of the thin film was started 10 seconds after the cutting of the fiber.

When the cut surface of the fiber was observed through an optical microscope, it was confirmed that the end surface of DAN constituting the core remained specular.

Further, when time aging of the amount of transmitted light of an HeNe laser was examined, the amount of transmitted light which was lost was much less than the untreated case.

EXAMPLE 3

$MgF_2$ was used as the thin film material, and was placed in a heating crucible in an ICB apparatus. The fiber wavelength-conversion element used in Example 1 was placed in the vacuum chamber of the ICB apparatus in the same manner as in Example 1. The $MgF_2$ was heated to 1050° C., and an ion cluster was generated under conditions where the ionizing current was 29.5 A and the acceleration voltage was 2 kV. The fiber was cut after a shutter was opened, and a thin film of $MgF_2$ having a thickness of 1900Å, where the refractive index of the film was minimized at a wavelength of 1.06 μm, was formed at a rate of 15 Å/sec.

The amount of transmitted light of the fiber wavelength-conversion element having the thin film formed thereon was larger, by 1%, than that of a fiber wavelength-conversion element which had no thin film.

Further, the $MgF_2$ thin film was stable for three months or more and did not separate from the core, although a thin $MgF_2$ film which was formed through vacuum evaporation was separated after one week.

When the amount of transmitted light of a HeNe laser was examined with respect to the fiber wavelength-conversion element, the value did not change over 500 hours or more, as shown in FIG. 3.

The same effects were also obtained using $SiO_2$ in place of $MgF_2$.

EXAMPLE 4

The fiber wavelength-conversion element used in Example 1 was disposed in the vacuum chamber of an ECR apparatus in the same manner was in Example 1. The pressure in the vacuum chamber was reduced to $1 \times 10^{-6}$ torr, and a thin film made of $SiN_3$ and having a thickness of 980Å was formed at a rate of 3 Å/sec by using an input wave of an output of 300 W, while introducing $N_2$ gas and $SiH_4$ gas into the chamber.

The thin film was stable for three months or more, and did not separate.

EXAMPLE 5

A fiber wavelength-conversion element having a core diameter of 5 μm and a clad outer diameter of 300 μm was formed using 2-chloro-5-nitrobenzaldehyde (CNA) as the core and using PYREX glass (registered trademark of CORNING Inc.) as the clad in the same manner as in Example 1. The fiber was cut and a thin film of $SiO_2$ was formed on the cut end surface in the same manner as in Example 1, except that the thin film having a thickness of 180Å was formed while cooling the fiber wavelength-conversion element to −50° C.

When the cut end surface was observed through an optical microscope, it was confirmed that the end surface of the CNA core remained specular.

EXAMPLE 6

A thin film of $MgF_2$ was formed on a cut surface of a fiber wavelength-conversion element having a core diameter of 5 μm and a clad outer diameter of 300 μm in which the core is made of 3,5-dimethyl-1-(4-nitrophenyl)-pyrazole (PRA) and the clad is made of above-mentioned PYREX glass in the same manner as in Example 2 except that the fiber was cooled to −20° C.

When the cut surface was observed through an optical microscope, it was confirmed that the end surface of the PRA core remained specular.

When the amount of transmitted light of an HeNe laser was examined with respect to the fiber wavelength-conversion element, the value did not change for 500 hours or more as shown in FIG. 3.

EXAMPLE 7

The P fiber wavelength-conversion element used in Example 6 was placed in a plasma polymerization apparatus (PD-10s, produced by Samco International Laboratory) in which the substrate temperature was kept at 0° C., and the pressure in the chamber was reduced to $10^{-3}$ torr. Then, in the chamber, a hexatrifluorobenzene monomer which is used as the thin film material and $N_2$ were added at pressures 0.25 torr and 0.1 torr respectively. A plasma was generated using a discharge frequency of 13.56 MHz, a discharge output of 25 W, and an electrode distance of 30 mm. After stabilization of the plasma, the fiber was cut in the chamber and a thin film having a thickness of 0.5 $\mu$m was formed on the cut surface.

When the cut surface was observed through an optical microscope, it was confirmed that an end surface the PRA core remained specular.

Further, when the amount of transmitted light of a HeNe laser was examined with respect to the fiber wavelength-conversion element, the value did not change for 500 hours or more.

EXAMPLE 8

A thin film was formed on a cut surface of a fiber wavelength-conversion element in the same manner as in Example 7 except that tetramethysilane was used in place of hexafluorobenzene and the pressure of the tetramethylsilane in the chamber was 0.2 torr, $O_2$ was used in place of $N_2$ at a pressure of 0.4 torr, and the discharge output was 50 W.

When the cut surface was observed through an optical microscope, it was confirmed that an end surface of the PRA core remained specular.

The film formed by this method was harder than that formed in Example 7, and was similar in physical characteristics to an inorganic material film. When the amount of transmitted light of a HeNe laser was examined with respect to the fiber wavelength-conversion element, the value did not change for 1000 hours or more.

COMPARATIVE EXAMPLE b 1

A fiber wavelength-conversion element was obtained in the same manner as in Example 1 except that no thin film was formed on an end surface.

When the end surface of the fiber wavelength-conversion element was observed through an optical microscope, sublimation of the crystal constituting the core was not observed.

The amount of transmitted light of a HeNe laser was examined with respect to the fiber wavelength-conversion element. The amount of transmitted light decreased over time as shown in FIG. 3. It was observed that the rate of reduction of the quantity of transmission light increased as the humidity rose.

Further, when the fiber wavelength-conversion element was cut, and then inserted into a vacuum chamber, and a thin film was formed thereon in the same manner was in Example 1, it was found that the crystal core was slightly sublimated and the amount of transmitted light of a HeNe laser was reduced to about 85% as much as that before the formation of the thin film.

COMPARATIVE EXAMPLE 2

A fiber wavelength-conversion element was obtained in the same manner was in Example 5 except that no thin film was formed on an end surface.

When the end surface of the fiber wavelength-conversion element was observed through an optical microscope, it was observed that the crystal constituting the core was sublimated to a depth of a few $\mu$m.

Figure 4:
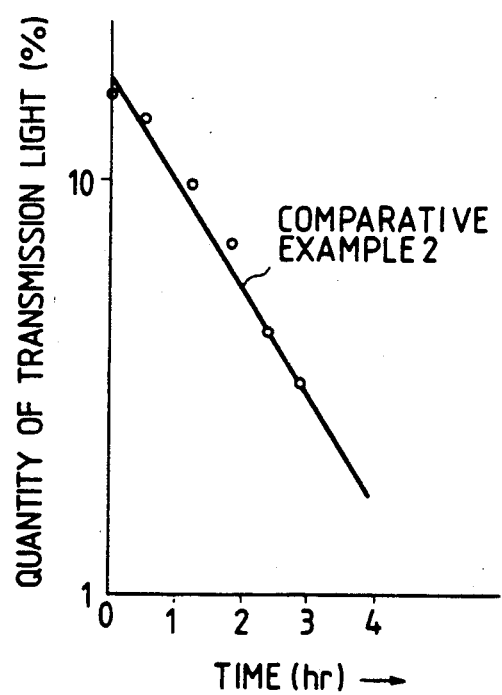
FIG. 4 is a graph which shows the time-aging of the amount of light transmitted from a HeNe laser in the fiber wavelength-conversion element obtained in Comparative Example 2.

Further, when the amount of transmitted light of a HeNe laser was examined with respect to the fiber wavelength-conversion element, the amount of transmitted light was reduced over elapsed time and the value became half as much as that in the beginning, as shown in FIG. 4.

The fiber was cut and then placed in a vacuum chamber of $1\times10^{-3}$ torr for ten minutes. On examination after this treatment, the crystal core had sublimed by about 500 $\mu$m.

From Examples 1 through 8 and Comparative Examples 1 and 2, it was observed that the method of the present invention produces a thin film on a fiber end surface with no sublimation of the organic crystal core.

Further, as seen from FIGS. 3 and 4, reduction of the amount of transmitted light over time can be prevented or remarkably improved by formation of a thin film on a fiber end surface using the present method.

Further, from Example 8, it was found that when a thin film is formed on an end surface of a fiber using a silane compound or a silicone monomer, a harder film, similar to an inorganic material was obtained. The reduction of the amount of transmitted light over time was particularly improved.

What is claimed is:

1. A method of forming a thin film on an end surface of a fiber comprising an organic core formed from a material selected from organic crystals and high molecular weight organic material, and a clad made of glass, said method comprising:
    (a) placing the fiber in a vacuum chamber;
    (b) reducing the pressure in the chamber;
    (c) cutting the fiber under reduced pressure; and
    (d) forming a thin film on the cut surface of said fiber, using a vapor phase film forming process, simultaneously with or immediately after the cutting.

2. A method according to claim 1, wherein the thin film is formed using a method selected from a vapor deposition method, a sputtering method, a plasma CVD method, a cluster ion beam method, and an electron cyclotron resonance method.

3. A method according to claim 2, wherein the thin film is formed using a method selected from a cluster ion beam method and an electron cyclotron resonance method.

4. A method according to claim 1, wherein the thin film is transparent to visible and near-infrared radiation.

5. A method according to claim 4, wherein the thin film is a dielectric material.

6. A method according to claim 1, wherein the thin film is formed of a material selected from $SiO_2$, $MgF_2$, $Al_2O_3$, $Si_4N_3$, $LiNbO_3$ and ZnO.

7. A method according to claim 1, wherein the thin film is formed of a material selected from polyethylene, polymethyl methacrylate, polyacrylic acid, silane, silicone monomer and hexatrifluoro benzene monomer.

8. A process according to claim 1, wherein the glass clad is selected from PYREX glass and lead glass.

9. A method according to claim 1, wherein the organic core is a high molecular weight material selected from silicone resin, styrene resin and acryl resin.

10. A method according to claim 1, wherein the organic core is selected from an organinonlinear optical crystal exhibiting a second degree non-linear optical effect, and an organic non-linear optical crystal exhibiting a third degree non-linear optical effect.

11. A method according to claim 10, wherein the organic crystal core is an organic nonlinear optical crystal exhibiting a second degree non-linear optical effect selected from 3-nitro-5-(N,N-dimethylamino)-acetanilide; 3-(N,N-dimethylamino)-aniline; N-(4'-methoxybenzoyl)-4-cyanoaniline, N-methyl-N-(4-cyanophenyl) aminoacetonitrile, N-(4-cyanophenyl) aminoacetonitrile, 4-nitrobenziriden-2,3-dimethylaniline, 4-nitrobenziriden-2,4-dimethylaniline, 4-nitrobenziriden-2,5-dimethylaniline, 4-nitrobenziriden-4,4-dimethylaniline, 4-nitro-benziriden-3,5-dimethylaniline, 4-nitrobenziriden-2,4-dimethoxyaniline, 4-nitrobenziriden-3,4,5-trimethoxyaniline, 2-nitrobenziriden-3, 4,5-trimethoxyaniline, 3-nitrobenziriden-2,3-dimethylaniline, 3-nitrobenziriden-2,5-dimethylaniline, 3-nitrobenziriden-3,5-dimethylaniline, 2-methyl-4-nitroaniline (MNA), 4-(N,N-dimethylamino)-3-acetamidenitrobenzene (DAN), 4,5-dimethyl-1,3-dithiol-2-iridencyanoacetate, 1,3-dithiol-2-iridencyanoacetate, N-(4-nitrophenyl)-(S)-prolinol (NPP), N-(5-nitro-2-pyridyl)-(S)-prolinol (NPP), N-(5-nitro-2-pyridyl)-(S)-phenylalalinole (NPPA) and 9-methylcarbazole-3-carboxaldehyde.

12. A method according to claim 10, wherein the organic core is an organic nonlinear optical crystal exhibiting a third degree non-linear optical effect selected from p-nitroaniline, 4-(dimethylamino)-4'-nitrostilbene, and 4'-(N,N'-dimethylamino) benziriden-4-nitroaniline.

* * * * *